(12) United States Patent
Bryce et al.

(10) Patent No.: US 8,574,440 B2
(45) Date of Patent: Nov. 5, 2013

(54) METHOD AND ARTICLE OF MANUFACTURE FOR SOLVENT EXTRACTION OPERATION

(75) Inventors: Charles Lorenzo Bryce, Pima, AZ (US); Jason Moore Morgan, Morenci, AZ (US); Willian Ryan Sircy, Thatcher, AZ (US); Rosemary Dawn Blosser, Thatcher, AZ (US)

(73) Assignee: Freeport-McMoran Corporation, Phoenix, AZ (US)

( * ) Notice: Subject to any disclaimer, the term of this patent is extended or adjusted under 35 U.S.C. 154(b) by 272 days.

(21) Appl. No.: 12/899,935

(22) Filed: Oct. 7, 2010

(65) Prior Publication Data

US 2012/0085706 A1    Apr. 12, 2012

(51) Int. Cl.
*B01D 11/04* (2006.01)
*G06G 7/32* (2006.01)
*G06F 7/60* (2006.01)
*C02F 1/26* (2006.01)
*G01N 31/00* (2006.01)

(52) U.S. Cl.
USPC ............... 210/739; 210/634; 702/31; 702/32; 703/2; 703/12

(58) Field of Classification Search
None
See application file for complete search history.

(56) References Cited

U.S. PATENT DOCUMENTS

| | | | | |
|---|---|---|---|---|
| 5,932,100 A | * | 8/1999 | Yager et al. ................. | 210/634 |
| 6,134,950 A | * | 10/2000 | Forster et al. ............... | 73/54.01 |
| 6,177,055 B1 | | 1/2001 | Virnig et al. | |
| 6,336,085 B1 | | 1/2002 | Ueda et al. | |

FOREIGN PATENT DOCUMENTS

| | | |
|---|---|---|
| WO | WO 2004028964 | 4/2004 |
| WO | WO 2004092426 | 10/2004 |

OTHER PUBLICATIONS

White, F.M. Fluid Mechanics. McGraw-Hill, 4th ed. (1994) pp. 227-230.*
Fan, Eric Sheung-Chi. A numerical model for oil/water separation from a solid particle. Available at <http://hdl.handle.net/1807/24566> on Jul. 26, 2010. Accessed Mar. 6, 2013.*
International Preliminary Report on Patentability from corresponding International Application No. PCT/US2011/053978, dated Jan. 22, 2013.
International Search Report and Written Opinion from corresponding International Application No. PCT/US2011/053978, dated Dec. 16, 2011.

* cited by examiner

*Primary Examiner* — Katherine Zalasky
(74) *Attorney, Agent, or Firm* — Snell & Wilmer L.L.P.

(57) ABSTRACT

The present invention relates to a method and article for manipulating an amount of organic material entrained in an aqueous phase of a solvent extraction process. The method includes estimating an interfacial shear stress between an aqueous phase and an organic phase of a solvent extraction apparatus, estimating an amount of organic material entrained in the aqueous phase based on the estimated interfacial shear stress, and manipulating one or more solvent extraction process parameters to manipulate the amount of organic material entrained in the aqueous phase. The method and apparatus can be used to improve performance of and reduce operating costs associated with the solvent extraction apparatus.

15 Claims, 3 Drawing Sheets

METHOD AND ARTICLE OF MANUFACTURE FOR SOLVENT EXTRACTION OPERATION

FIELD OF INVENTION

The present invention relates, generally, to a solvent extraction method and to an article of manufacture relating thereto. More particularly, the invention relates to a method for using a model to estimate interfacial shear stress between two immiscible phases of a solvent extraction process and to predict an amount of material entrained in at least one of the phases. The invention further relates to, based on use of the model, manipulating one or more parameters of a solvent extraction process to improve the performance thereof.

BACKGROUND OF THE INVENTION

Hydrometallurgical processing of ore is often used to recover metal, such as copper, silver, platinum group metals, molybdenum, zinc, nickel, cobalt, uranium, rhenium, rare earth metals, combinations thereof, and the like from ore. In general, hydrometallurgical processes include three steps: leaching (e.g., atmospheric leaching, pressure leaching, agitation leaching, heap leaching, stockpile leaching, thin-layer leaching, vat leaching, or the like) ore to obtain a pregnant leach solution including desired metal ions, purifying and concentrating the pregnant leach solution, using, e.g., a solvent extraction process, and recovering the metal, using, e.g., an electrowinning, sulphidation, precipitation, ion exchange or any other process suitable for recovery of metals.

During a solvent extraction process, the pregnant leach solution is mixed with an organic material that generally includes a diluent, such as oil, and a metal-specific extractant. The leach solution and organic material are mixed to form a dispersion and/or emulsion. The dispersion/emulsion mixture of the pregnant leach solution and the organic material is then allowed to settle to form a depleted aqueous (heavier, bottom) phase and a loaded organic (lighter, top) phase, which includes the desired metal ions. A crud layer, including an emulsion and/or dispersion of organic and aqueous materials as well as fine particles, may also form between the aqueous and organic phases.

The loaded organic phase may be sent to a wash or stripper stage to strip the copper ions into an electrolyte solution for subsequent recovery of the metal. The depleted aqueous phase may be further treated, may be recycled for leaching additional ore, and/or may be forwarded to a secondary metal extraction process for recovery of additional metals.

Unfortunately, separation of the organic and aqueous phases is typically incomplete, with some residual organic material entrained in the aqueous phase and some residual aqueous material entrained in the organic phase. The residual material entrained in the respective phases, especially in the case of organic material entrained in the aqueous phase, increases costs associated with recovering metal from ore, because the organic material is relatively expensive, and any organic material entrained in the aqueous phase may be lost and thus additional organic material is required for the extraction of metal ions. Accordingly, improved articles and methods for improving solvent extraction operation and for reducing an amount of organic material entrained in an aqueous phase associated with the solvent extraction operation are desired.

SUMMARY OF THE INVENTION

The present invention generally relates to an article and process that employ a model to estimate an amount of organic material entrained in an aqueous phase of a solvent extraction process based on an estimated interfacial shear stress between the aqueous phase and an organic phase in a solvent extraction unit. While the ways in which the present invention addresses the drawbacks of the prior art are discussed in greater detail below, in general, the method and article can be used to selectively manipulate operating parameters of a solvent extraction process to manipulate or reduce an amount of organic material entrained in an aqueous phase of a solvent extraction unit and thereby reduce organic material loss and operating costs of the solvent extraction unit.

In accordance with various embodiments of the invention, a method for manipulating an amount of organic material entrained in an aqueous phase of a solvent extraction process includes the steps of providing a computational model for estimating an amount of organic material entrained in an aqueous phase as a function of an interfacial shear stress between an organic phase and the aqueous phase, using the computational model to estimate a target amount of organic material entrained in the aqueous phase, selecting one or more process parameters to manipulate the interfacial shear stress between the organic phase and the aqueous phase, and adjusting the one or more process parameters to manipulate the amount of organic material entrained in the aqueous phase of the solvent extraction unit. In accordance with various aspects of these embodiments, the step of providing a computational model for estimating an amount of organic material entrained in an aqueous phase includes using the Navier-Stokes fluid flow equations to calculate velocity profiles of the aqueous phase and the organic phase. In accordance with additional aspects, the step of providing a computational model for estimating an amount of organic material entrained in an aqueous phase further includes using the Shear Stress in Fluids equation to estimate the interfacial shear stress between the organic phase and the aqueous phase. In accordance with yet further aspects of these embodiments, the step of selecting one or more process parameters includes selecting a parameter that affects a variable in the Navier-Stokes equations and/or the Shear Stress in Fluids equation. Such process parameters include, for example, one or more of: process (e.g., settler) temperature, an organic phase depth (e.g., without crud), a crud depth, an aqueous phase depth, an organic material flow rate, an aqueous material flow rate, an aqueous material recycle flow rate, a stripped organic material recycle flow rate, a raffinate flow rate, a crud flow rate, a loaded organic flow rate, an organic-to-aqueous ratio in the solvent extraction unit, a percentage of organic material recovered, an aqueous material specific flow, an organic material specific flow, aqueous phase retention time, organic phase retention time, crud retention time, solvent extraction unit configuration, settler dimensions (e.g., length, width, and height), location, type and number of flow distribution fences and when the fences were last cleaned, viscosity (e.g., kinematic or dynamic) of the organic material, viscosity (e.g., kinematic or dynamic) of the pregnant leach solution, viscosity (e.g., kinematic or dynamic) of the aqueous phase, and viscosity (e.g., kinematic or dynamic) of the organic phase, a density of the organic phase, a density of the aqueous phase, mixer parameters, such as break time, type of mixer, whether pumping is required, speed of the mixer, and amps applied to the mixer, and other parameters, including frequency of crud pumping, the organic reagent, the organic diluent, ratio of organic reagent to reagent diluent, separator (e.g., hydrocyclone and/or tricanter) configuration and flow rate, and whether coalescing packs are used.

In accordance with yet additional aspects of the exemplary embodiments, the step of providing a computational model includes the step of obtaining a correlation between estimated interfacial shear stress values and measured values of organic material entrained in the aqueous phase.

In accordance with additional exemplary embodiments of the invention, a method of altering an amount of organic material loss in a solvent extraction unit includes the steps of calculating a velocity profile of an aqueous phase, calculating a velocity profile of an organic phase; calculating an interfacial shear stress using the velocity profile of an aqueous phase and the velocity profile of an organic phase, estimating an amount of organic material entrained in the aqueous phase based on a calculated interfacial shear stress, determining a target amount of organic material entrained in the aqueous phase, and manipulating at least one process condition of the solvent extraction unit to obtain the target amount of organic material entrained in the aqueous phase. In accordance with various aspects of these embodiments, the steps of calculating a velocity profile of an aqueous phase and calculating a velocity profile of an organic phase are estimated using the Navier-Stokes Fluid Flow equations. In accordance with yet additional aspects, the step of calculating an interfacial shear stress includes using the Shear Stress in Fluids equation. In accordance with yet further aspects, the step of estimating an amount of organic material entrained in the aqueous phase includes a step of obtaining a correlation between estimated interfacial shear stress values and measured values of organic material entrained in an aqueous phase. In accordance with additional aspects, the step of manipulating a process condition of the solvent extraction process includes adjusting one or more of: solvent extraction unit (e.g., settler) temperature, an organic phase depth, a crud depth, an aqueous phase depth, an organic material flow rate, an aqueous material flow rate, a recycle flow rate, a raffinate flow rate, a crud flow rate, a loaded organic flow rate, an organic-to-aqueous ratio in the solvent extraction unit, an aqueous material specific flow, an organic material specific flow, aqueous phase retention time, organic phase retention time, crud retention time, solvent extraction unit configuration, settler dimensions (e.g., length, width, and height), location, type and number of flow distribution fences and when the fences were last cleaned, viscosity of the organic material, viscosity of the pregnant leach solution, viscosity of the aqueous phase, and viscosity of the organic phase, mixer parameters, such as break time, type of mixer, whether pumping is required, speed of the mixer, and amps applied to the mixer, and other parameters, including frequency of crud pumping, the organic reagent, the organic diluent, ratio of organic reagent to reagent diluent, separator (e.g., hydrocyclone and/or tricanter) configuration and flow rate, and whether coalescing packs are used.

In accordance with yet additional embodiments of the invention, an article of manufacture includes a non-transitory computer readable medium having instructions stored thereon that, in response to execution by a computing device, cause the computing device to perform the operations of: calculating a velocity profile of an aqueous phase, calculating a velocity profile of an organic phase, calculating an estimated interfacial shear stress using the velocity profile of an aqueous phase and the velocity profile of an organic phase, and estimating an amount of organic material entrained in the aqueous phase based on a calculated interfacial shear stress. In accordance with various aspects of these embodiments, the operations further include a step of performing a correlation between estimated interfacial stress values and measured values of organic material entrained in the aqueous phase. In accordance with yet additional aspects, the instructions allow for one or more solvent extraction process parameters to be selected and manipulated and a new estimated amount of organic material entrained in the aqueous phase to be calculated in response thereto. In accordance with an additional aspect, the one or more solvent extraction process parameters are manipulated to reduce or minimize an amount of entrained material.

These and other features and advantages of the present invention will become apparent upon a reading of the following detailed description when taken in conjunction with the drawing figures, wherein there is shown and described various illustrative embodiments of the invention.

BRIEF DESCRIPTION OF THE DRAWING FIGURES

The exemplary embodiments of the present invention will be described in connection with the appended drawing figures in which like numerals denote like elements and.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF THE INVENTION

The present invention provides a method and article for improving operation of a solvent extraction process. As set forth in more detail below, the method and article can be used to predict and to manipulate an amount of organic material entrained in an aqueous phase of a solvent extract process, and therefore can be used to reduce operating costs of the solvent extraction process.

Figure 1:
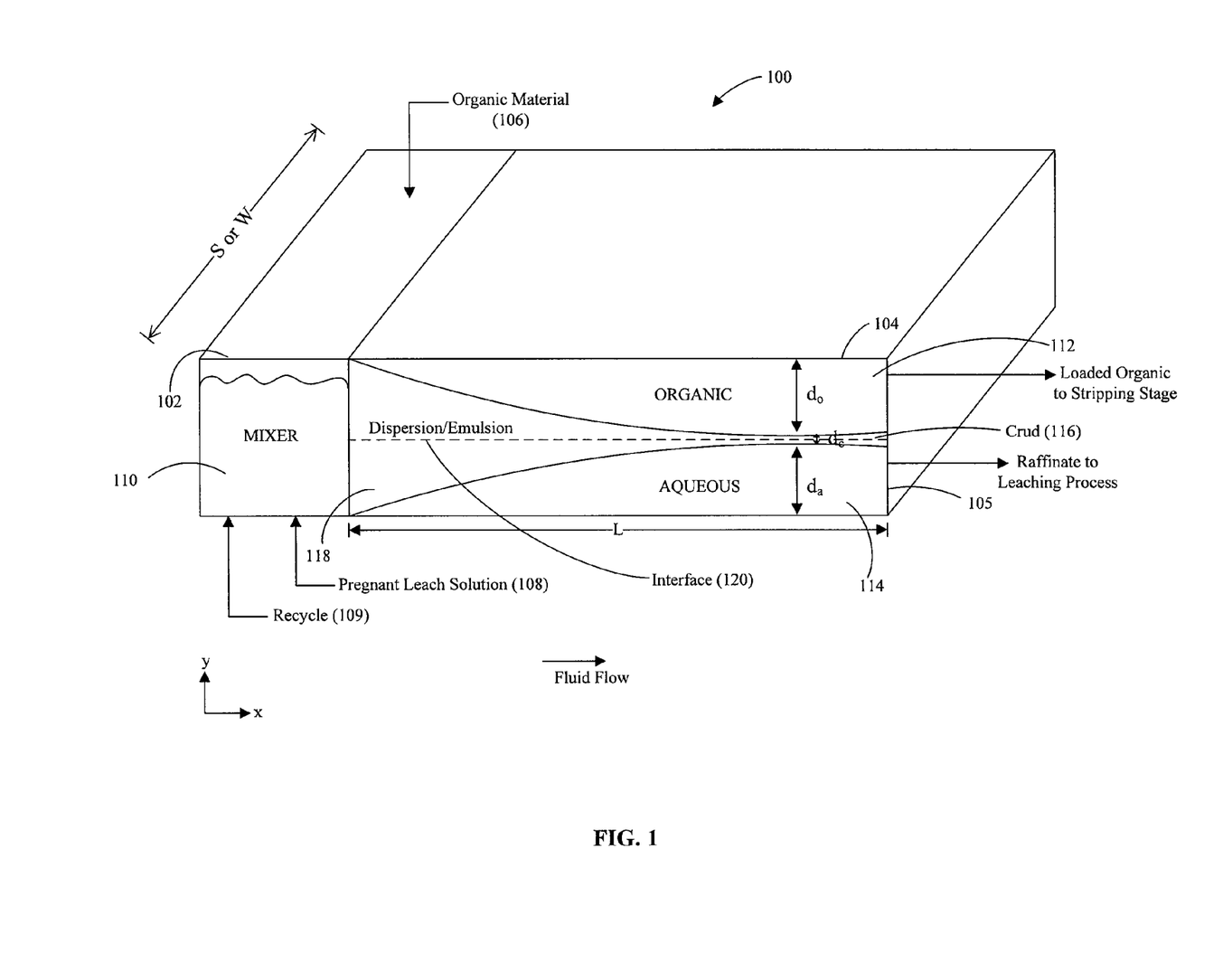
FIG. 1 illustrates a solvent extraction unit for use in accordance with various exemplary embodiments of the invention.

FIG. 1 schematically illustrates a solvent extraction unit 100 for use in accordance with various embodiments of the invention. Unit 100 may be configured to remove or concentrate a variety of metal ions, such as copper, silver, platinum group metals, molybdenum, zinc, nickel, cobalt, uranium, rhenium, rare earth metals, combinations thereof and the like. However, for sake of brevity and concision, unit 100 is conveniently described herein in connection with concentration of copper metal ions.

In the illustrated example, unit 100 includes at least one mixer 102 and at least one settler 104. Unit 100 may also include a number of flow distribution fences and/or coalescing packs 105. In operation, stripped organic solution (e.g., from a metal recovery process) and/or fresh organic solution (organic material) 106, pregnant leach solution 108, and optionally recycle stream 109 (including, e.g., solution recycled from a subsequent process, such as a metal recovery process) are fed to mixer 102 to form a dispersed/emulsified solution 110. Solution 110 is then fed to one or more settlers 104, where solution 110 separates into an organic phase 112, an aqueous phase 114, and an dispersion/emulsion 118. A crud layer 116, including an emulsion and/or dispersion and fine particles, typically forms between organic phase 112 and aqueous phase 114.

Although illustrated in a side-by-side configuration, unit 100 may additionally or alternatively include mixers above or below settler 104. In addition, one or more mixers 102 may be coupled to a single settler 104 or multiple settlers may be coupled to one or more mixers. Furthermore, unit 100 may include any desired number of flow distribution fences, coalescing packs, and/or weirs to facilitate separation of the phases. Multiple units 100 may also be coupled together in series and/or in parallel configurations.

During operation of unit 100, various operational parameters may be adjusted to affect a change in an amount of organic material entrained in aqueous phase 114. Exemplary parameters that may be altered to effect a change in an amount of organic material entrained in aqueous phase 114 include: unit 100 (e.g., settler) temperature, an organic phase depth ($d_o$), a crud depth ($d_c$), an aqueous phase depth ($d_a$), an organic material flow rate, an aqueous material flow rate, an aqueous material recycle flow rate, a stripped organic material recycle flow rate, a raffinate flow rate, a crud flow rate, a loaded organic flow rate, an organic-to-aqueous ratio in the solvent extraction unit, a percentage of organic material recovered, an aqueous material specific flow, an organic material specific flow, aqueous phase retention time, organic phase retention time, crud retention time, solvent extraction unit configuration, settler dimensions (e.g., length, width, and height), location, type and number of flow distribution fences and when flow distribution fences were last cleaned, viscosity (e.g., kinematic or dynamic) of the organic material, viscosity (e.g., kinematic or dynamic) of the pregnant leach solution, viscosity (e.g., kinematic or dynamic) of the aqueous phase, and viscosity (e.g., kinematic or dynamic) of the organic phase, a density of the organic phase, a density of the aqueous phase, mixer parameters, such as break time, type of mixer, whether pumping is required, speed of the mixer, and amps applied to the mixer, and other parameters, including frequency of crud pumping, the organic reagent, the organic diluent, ratio of organic reagent to reagent diluent, separator (e.g., hydrocyclone and/or tricanter) configuration and flow rate, and whether coalescing packs are used.

Figure 2:
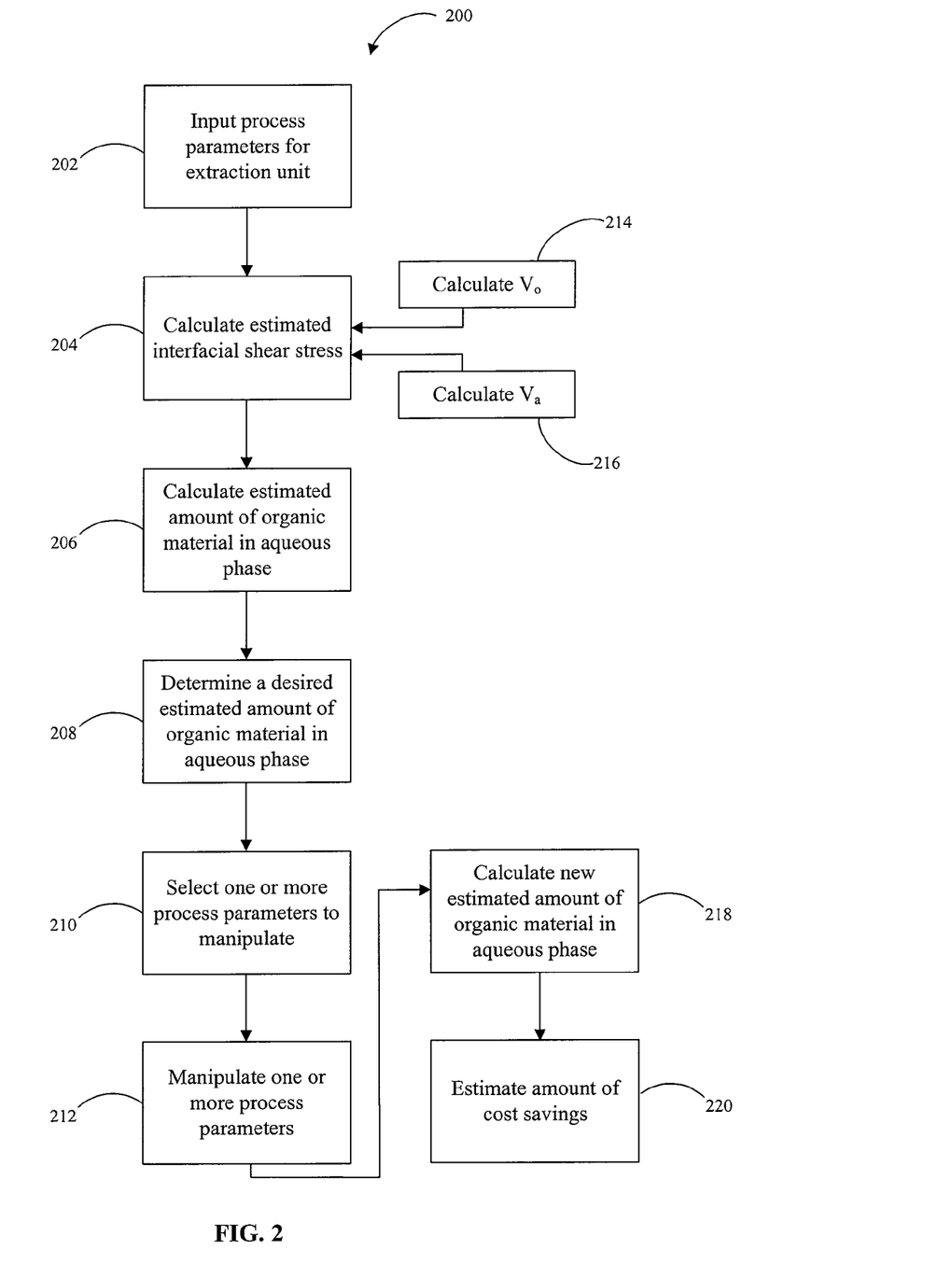
FIG. 2 illustrates a method of manipulating an amount of organic material entrained in an aqueous phase of a solvent extraction process in accordance with various embodiments of the invention.

FIG. 2 illustrates a method 200 for manipulating an amount organic material entrained in an aqueous solution of a solvent extraction unit in accordance with various exemplary embodiments of the invention. As discussed in more detail below, several steps of method 200 may be performed using a non-transitory computer readable medium having instructions stored thereon that, in response to execution by a computing device, cause the computing device to perform the desired operations.

Method 200 may be used to manipulate an amount of entrained material for various materials in organic phase 112 or aqueous phase 114; however, the invention is conveniently described in connection with organic material entrained in aqueous phase 114, and more specifically, to organic material including an oil and a metal-specific extraction agent (e.g., aldoxime, ketoxime, a combination thereof, aldoxime plus a modifier, or a combination of aldoxime, ketoxime, and a modifier, in the case of copper ion extraction) and an aqueous phase including a copper leaching solution, such as sulfuric acid in an aqueous solution. Manipulating an amount of organic material in an aqueous phase may be particularly desirable because the organic material is relatively costly and any entrained organic material me may be sent to a leaching process, such that most, if not all of the entrained organic material is lost.

Method 200 generally includes the steps of inputting solvent extraction unit process parameter conditions (step 202), calculating an estimated interfacial shear stress (step 204), calculating an estimated amount of organic material in an aqueous phase (step 206), determining a desired amount of organic material entrained in the aqueous phase (step 208), selecting one or more solvent extraction process parameters to manipulate (step 210), manipulating one or more solvent extraction process parameters (step 212), and optionally calculating a new estimated amount of organic material in the aqueous phase (step 218) and/or optionally calculating an estimated amount of cost savings (step 220).

Step 202 includes inputting conditions for one or more process parameters that affect interfacial shear stress between organic phase 112 and aqueous phase 114—i.e., the shear stress between the two phases at an interface graphically illustrated as line 120 in FIG. 1. An exemplary model for estimating interfacial shear stress between organic phase 112 and aqueous phase 114 is set forth in greater detail below; however, exemplary parameters that may affect one or more variables used to estimate interfacial shear stress include one or more of: unit 110 (e.g., settler) temperature, an organic phase depth, a crud depth, an aqueous phase depth, an organic material flow rate, an aqueous material flow rate, an aqueous material recycle flow rate, a stripped organic material recycle flow rate, a raffinate flow rate, a crud flow rate, a loaded organic flow rate, an organic-to-aqueous ratio in the solvent extraction unit, a percentage of organic material recovered, an aqueous material specific flow, an organic material specific flow, aqueous phase retention time, organic phase retention time, crud retention time, solvent extraction unit configuration, settler dimensions (e.g., length, width, and height), location, type and number of flow distribution fences and when the fences were last cleaned, viscosity (e.g., kinematic or dynamic) of the organic material, viscosity (e.g., kinematic or dynamic) of the pregnant leach solution, viscosity (e.g., kinematic or dynamic) of the aqueous phase, and viscosity (e.g., kinematic or dynamic) of the organic phase, a density of the aqueous phase, a density of the organic phase mixer parameters, such as break time, type of mixer, whether pumping is required, speed of the mixer, and amps applied to the mixer, and other parameters, including frequency of crud pumping, the organic reagent, the organic diluent, ratio of organic reagent to reagent diluent, separator (e.g., hydrocyclone and/or tricanter) configuration and flow rate, and whether coalescing packs are used.

A user may input one or more of the operational parameter conditions selected from this list in response to a request from execution of a computer device and may enter additional information as requested and/or desired. In accordance with one particular example, values for settler dimensions (length, width, and height), organic depth, crud depth, organic flow rate, aqueous flow rate, aqueous material recycle flow rate, organic material kinematic viscosity, aqueous material kinematic viscosity, organic phase material density, aqueous phase material density, the organic reagent, the organic diluent, the organic volume, and percent recovered organic material are inputted during step 202.

During step 204, an interfacial shear stress between organic phase 112 and aqueous phase 114 is estimated using a computational model and the information entered during step 202. As illustrated in FIG. 2, step 204 may include sub steps 214 and 216 to respectively calculate an estimated velocity profile organic phase 112 and an estimated velocity profile of aqueous phase 114 in settler 104.

In accordance with exemplary embodiments of the invention, velocity profiles of organic phase 112 and aqueous phase 114 are estimated using the Navier-Stokes equations. By way of example, assuming Newtonian, non-compressible fluids, the simplified Navier-Stokes equations below can be used to estimate velocity profiles of organic phase 112 and aqueous phase 114.

For fluid flow in the x direction, the Navier-Stokes equations can be expressed as:

$$\rho\left(\frac{\partial u}{\partial t} + u\frac{\partial u}{\partial x} + v\frac{\partial u}{\partial y} + w\frac{\partial u}{\partial z}\right) = \qquad \text{equation 1}$$
$$-\frac{\partial p}{\partial x} + \rho g_x + \mu\left(\frac{\partial^2 u}{\partial x^2} + \frac{\partial^2 u}{\partial y^2} + \frac{\partial^2 u}{\partial z^2}\right)$$

where $\rho$ is the fluid density, u, v, w are the velocity components in the x, y, and z directions, respectively, g is the gravity, $\mu$ is the dynamic viscosity, and p is the pressure.

Assuming steady-state flow and fluid flow in the x direction only, equation 1 can be simplified as shown.

$$0 = -\frac{\partial p}{\partial x} + \mu\left(\frac{\partial^2 u}{\partial y^2}\right) \text{ or, rearranged, } \left(\frac{\partial^2 u}{\partial y^2}\right) = \frac{1}{\mu}\left(\frac{\partial p}{\partial x}\right) \qquad \text{equation 2}$$

Integrating twice and treating $$\left(\frac{\partial p}{\partial x}\right)$$

as a constant, equation 2 becomes:

$$u = \frac{1}{\mu}\left(\frac{\partial p}{\partial x}\right)y^2 + c_1 y + c_2, \qquad \text{equation 3}$$

where $c_1$ and $c_2$ are constants.

The flow is then calculated according to equation 4

$$q = s\int_0^d u\, dy \qquad \text{equation 4}$$

where s is the width of the settler (as illustrated in FIG. 1).

With the boundary condition assumptions:
$u_a = 0$ when $y = 0$
$\tau_o = 0$ when $y = d_a + d_o$
$\tau_o = \tau_a$ when $y = d_a$
$u_o = u_a$ when $y = d_a$ where d represents a depth and the subscripts o and a respectfully designate the organic and aqueous phases, the Shear Stress in Fluids Equation is reduced to $$\tau_{xy} = \mu\left(\frac{\partial u}{\partial y} + \frac{\partial v}{\partial x}\right) \qquad \text{equation 5}$$

where $\tau_{xy}$ is the estimated interfacial shear stress at the interface of organic phase 112 and aqueous phase 114, calculated with the Navier-Stokes equations and the Shear Stress in Fluids equations, with the assumptions and boundary conditions noted above.

Figure 3:
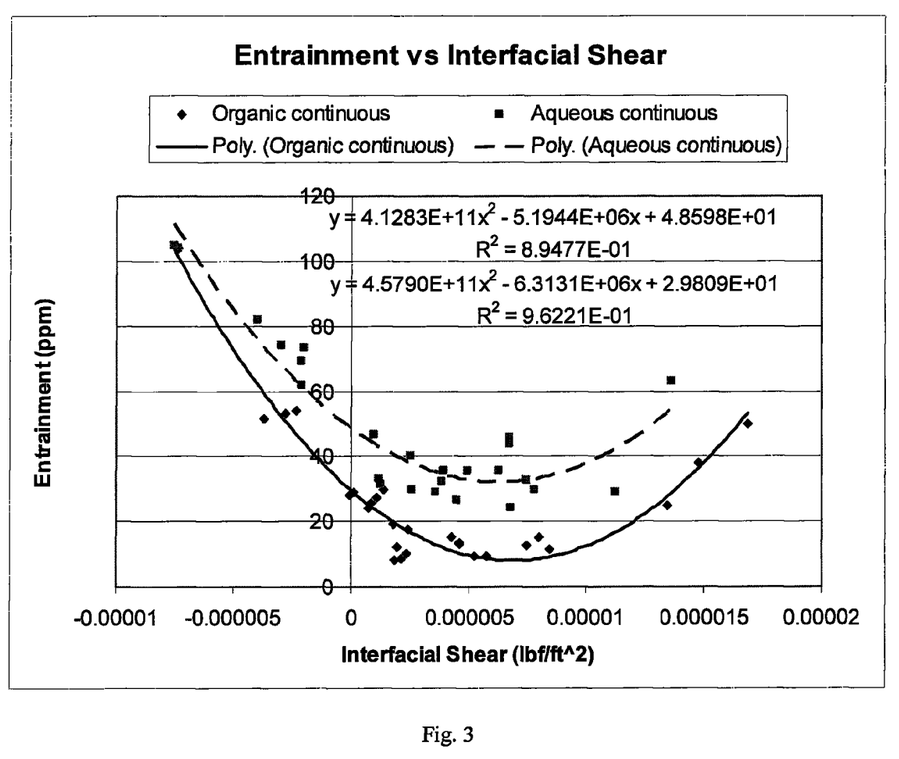
FIG. 3 illustrates a correlation between estimated interfacial shear stress values and values of organic material entrained in an aqueous phase of a solvent extraction unit.

In step 206 an estimated amount of organic material entrained in aqueous phase 114, based on an interfacial shear stress for a set of conditions, is estimated. In accordance with various exemplary embodiments of the invention, an estimated amount of organic material entrained in an aqueous phase is calculated by using a correlation between a plurality of measured organic material entrainment values for a solvent extraction unit and a plurality of estimated shear stress values estimated using, for example, the Navier-Stokes and Shear Stress in Fluids equations, as set forth above. In this case, step 204 is employed to estimate a plurality of interfacial shear stress values and a plurality of corresponding values for organic material entrained in the aqueous phase are correlated to the estimated interfacial shear stress values. By way of example, a least squares regression may be used to obtain a correlation between organic material entrained in the aqueous phase and the estimated interfacial shear stress values. FIG. 3 illustrates a least squares regression correlation of measured values of organic material entrained in an aqueous phase and estimated interfacial shear stress values and a correlation for aqueous material entrained in an organic phase. Similar techniques to those described above may be used to estimate an amount of aqueous material entrained in the organic phase.

Once a plurality of estimated values of interfacial shear stress and corresponding values (measured or estimated) for amounts of entrained organic material are correlated, a desired estimated amount of organic material entrained in the aqueous phase is selected in step 208. For example, referring to FIG. 3, it may be desirable to operate unit 110 at or near the lowest portion (minimum) of the curve, in which the least amount of organic material is entrained in the aqueous phase. Alternatively, based on, for example, operating costs associated with other interfacial shear stress values, it may be desirable to operate at other locations on the curve.

Once a desired value or values for organic material entrained in an aqueous phase are selected, one or more operating parameters are selected to alter an amount of organic material entrained in the aqueous phase in step 210. For example, one or more parameters selected from the list of one or more of: process (e.g., settler) temperature, an organic phase depth, a crud depth, an aqueous phase depth, an organic material flow rate, an aqueous material flow rate, an aqueous material recycle flow rate, a stripped organic material recycle flow rate, a raffinate flow rate, a crud flow rate, a loaded organic flow rate, an organic-to-aqueous ratio in the solvent extraction unit, an aqueous material specific flow, an organic material specific flow, aqueous phase retention time, organic phase retention time, crud retention time, solvent extraction unit configuration, settler dimensions (e.g., length, width, and height), location, type and number of flow distribution fences and when the fences were last cleaned, viscosity (e.g., kinematic or dynamic) of the organic material, viscosity (e.g., kinematic or dynamic) of the pregnant leach solution, viscosity (e.g., kinematic or dynamic) of the aqueous phase, and viscosity (e.g., kinematic or dynamic) of the organic phase, a density of the organic phase, a density of the aqueous phase, mixer parameters, such as break time, type of mixer, whether pumping is required, speed of the mixer, and amps applied to the mixer, and other parameters, including frequency of crud pumping, the organic reagent, the organic diluent, ratio of organic reagent to reagent diluent, separator (e.g., hydrocyclone and/or tricanter) configuration and flow rate, and whether coalescing packs are used—may be selected to affect the desired change in estimated interfacial shear stress and consequently in the estimated value for the amount of organic material entrained in the aqueous phase. By way of one particular example, an organic phase depth is selected and a new value for the organic phase depth is calculated to alter the interfacial shear stress to obtain the desired estimated amount of organic material in the aqueous phase.

In step 212, the one or more solvent extraction unit operating parameters selected in step 210 are manipulated to alter an estimated interfacial shear stress between the organic phase and the aqueous phase and consequently to alter an amount of organic material entrained in the aqueous phase.

Finally, in steps 218 and 220, a new estimated amount of organic material entrained in the aqueous phase is calculated based on the new value(s) of the one or more manipulated process parameters, optionally, a new estimated amount of aqueous material in the organic phase is calculated based on the new value(s), and a cost saving for the operation of unit 100 is estimated based on the new estimated amount of organic material in the aqueous phase and/or the new estimated amount of aqueous material in the organic phase.

In accordance with additional embodiments of the invention, an article of manufacture includes a non-transitory computer readable medium having instructions stored thereon that, in response to execution by a computing device, cause the computing device to perform at least a portion of the operations of method 200. The article may be in the form of any computer readable medium, such as volatile or non volatile memory, including, but not limited to random access memory (RAM), read only memory (ROM), serial access memory (SAM), static memory, virtual memory, and cache. The information may be stored on devices in the form of integrated circuits, optical discs, hard discs, or other suitable media.

In accordance with exemplary embodiments of the invention, the article of manufacture performs the following operations: calculating a velocity profile of an aqueous phase, calculating a velocity profile of an organic phase, calculating an estimated interfacial shear stress using the velocity profile of an aqueous phase and the velocity profile of an organic phase, and estimating an amount of organic material entrained in the aqueous phase based on a calculated interfacial shear stress. The operations of calculating a velocity profile of an aqueous phase, calculating a velocity profile of an organic phase, and calculating an estimated interfacial shear stress using the velocity profile of an aqueous phase and the velocity profile of an organic phase may be obtained using the Navier-Stokes and Shear Stress in Fluids equations—for example, using the assumptions and conditions noted above in connection with method 200.

In accordance with various aspects of these embodiments, the operations further include a step of performing a correlation between estimated stress values and measured values of organic material entrained in the aqueous phase. In accordance with yet additional aspects, the instructions allow for selection of one or more solvent extraction process parameters to be selected. The operations may further include providing a suggested adjustment for the one or more solvent extraction process parameters, calculating an amount of aqueous material entrained in the organic phase, calculating a new estimated amount of organic material in the aqueous phase based on the suggested adjustments, calculating a new estimated amount of aqueous material in the organic phase, and/or calculating an estimated cost savings based on the new estimated amount of organic material in the aqueous phase and/or based on the new estimated amount of aqueous material in the organic phase. The operations may further include calculations and warnings for input of inconsistent process parameters—for example, the operations may issue a warning if the organic depth and/or the crud depth exceed the height of the solvent extraction unit.

In accordance with additional exemplary embodiments, one or more methods disclosed herein may be implemented using various computer systems. Computer systems include components such as combinations of hardware, software, and a combination thereof. The computer systems contemplated herein may include one or more of the following computer system components: a host server or other device including a processor for processing digital data; a tangible, non-transitory memory coupled to a processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and one or more of databases. Computer system components may also comprise a module capable of executing logic.

A computer system may include an operating system (e.g., Windows NT, 95/98/2000/XP/Vista/7/Server, OS2, UNIX (e.g. Solaris), Android, Linux, MacOS, iOS, etc.) as well as various conventional support software and drivers typically associated with computers. The computer systems discussed herein may provide a suitable website or other Internet-based graphical user interface which is accessible by users. In one embodiment, Microsoft Internet Information Server (IIS), Microsoft Transaction Server (MTS), and Microsoft SQL Server, are used in conjunction with a Microsoft operating system (e.g. Windows Server), Microsoft IIS web server software, a Microsoft SQL Server database system, and a Microsoft Commerce Server. Additionally, components such as Access or Microsoft SQL Server, Oracle, Sybase, MySQL, Interbase, etc., may be used. In various embodiments, the Apache web server is used in conjunction with a Linux operating system, a MySQL database, and the Java, Perl, PHP, and/or Python programming languages. In various embodiments, a Java may be used to perform logic using data stored text files as well as data received from a web-based interface. In various embodiments, computer systems may comprise a database, an application, and a web server.

In accordance with various exemplary embodiments of the invention, a computer system component implementing logic disclosed is accessible via a web client. A web client includes any computing system (e.g., computer or mobile device) or application which communicates via any network. The computing system may take the forms of laptops, notebooks, hand held computers, personal digital assistants, mobile devices, cellular phones, set-top boxes, workstations, computer-servers, main frame computers, mini-computers, PC servers, network sets of computers, and/or the like. In an exemplary embodiment, a web client accesses other computer systems through a network. A web client may implement security protocols such as Secure Sockets Layer (SSL) and Transport Layer Security (TLS). A web client may implement several application layer protocols including http, https, ftp, and sftp. A web client may be implemented in the context of a mobile operating system, including for example, a Palm mobile operating system, a Windows mobile operating system, an Android Operating System, Apple iOS, a Blackberry operating system or the like.

A web client may include one or more browser applications to receive and render web pages. A web client may or may not be in direct contact with an application server. For example, a web client may access the services of an application server through another server and/or hardware component, which may have a direct or indirect connection to an Internet server. In an exemplary embodiment, access to various computer system components is through a network using commercially-available browser software package.

In accordance with other embodiments, a computer system component implementing logic disclosed herein is accessible via a network. As used herein, the term "network" includes any electronic communications system or method which incorporates hardware and/or software components. Communication among computer system components (e.g., a web client and a web server) may be accomplished through any suitable communication channel, such as, for example, a telephone network, an extranet, an intranet, Internet, mobile phone, online communications, satellite communications, wireless communications, transponder communications, local area network (LAN), wide area network (WAN), or virtual private network (VPN). In various embodiments, a network may use TCP/IP to transport data, although in other embodiments, the IPX, Appletalk, IP-6, and NetBIOS protocols may be used. In conjunction with TCP/IP, any tunneling protocol (e.g. IPsec, SSH) may also be used.

Exemplary computer system components implementing logic may be in communication with, and may use data stored in, one or more databases. Databases discussed herein may include relational, hierarchical, graphical, or object-oriented structure and/or any other database configurations. Common database products that may be used to implement the databases described herein include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, a database as used herein may comprise a text file such that a computer system component implementing logic disclosed herein may obtain data directly from a text file residing in a storage medium. The databases described herein may be organized in any suitable manner, for example, as data tables or lookup tables implemented as a text file or files. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

In various embodiments, a computer system component implementing logic disclosed herein may comprise or be associated with a computer system component referred to as a web server. A web server may retrieve appropriate web pages and send the data or applications for the web pages to an IP address. A web server may implement a web service that is capable of interacting with other applications over a communications means, such as the Internet.

In various embodiments, a computer system component implementing logic disclosed herein may produce or otherwise communicate via web pages or other structured data forms. For example, a computer system component implementing logic disclosed herein may incorporate, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like.

Similarly, the software elements of any computer system component disclosed herein may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that any computer system component may employ any number of conventional techniques for data transmission, signaling, data processing, network control, and the like. Still further, any computer system component could be used to detect or prevent security issues with a client-side scripting language, such as JavaScript, VBScript or the like.

For example, in various embodiments, a system for manipulating an amount of organic material entrained in an aqueous phase of a solvent extraction unit is provided; the system includes: a non-transitory memory communicating with a processor, the non-transitory memory having instructions stored thereon that, in response to execution by the processor, cause the processor to perform operations comprising providing a computational model for estimating an amount of organic material entrained in an aqueous phase of a solvent extraction unit as a function of an interfacial shear stress between an organic phase and the aqueous phase, using the computational model to estimate a target amount of organic material entrained in the aqueous phase, selecting one or more process parameters to manipulate the amount of organic material entrained in the aqueous phase, and recommending the adjustment of the one or more process parameters to manipulate the amount of organic material entrained in the aqueous phase of the solvent extraction unit.

Also for example, in various embodiments, a system for altering an amount of organic material loss in a solvent extraction unit includes: a non-transitory memory communicating with a processor, the non-transitory memory having instructions stored thereon that, in response to execution by the processor, cause the processor to perform operations comprising calculating a velocity profile of an aqueous phase, calculating a velocity profile of an organic phase, calculating an interfacial shear stress using the velocity profile of the aqueous phase and the velocity profile of the organic phase, estimating an amount of organic material entrained in the aqueous phase based on a calculated interfacial shear stress, determining a target amount of organic material entrained in the aqueous phase, and recommending the manipulation of at least one process condition of the solvent extraction unit to obtain the target amount of organic material entrained in the aqueous phase.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

The invention claimed is:

1. A method for manipulating an amount of organic material entrained in an aqueous phase of a solvent extraction unit, the method comprising the steps of:
   providing a computational model for estimating an amount of organic material entrained in an aqueous phase of a solvent extraction unit as a function of an interfacial shear stress between an organic phase and the aqueous phase;
   using the computational model to estimate a target amount of organic material entrained in the aqueous phase;
   selecting one or more process parameters to manipulate the amount of organic material entrained in the aqueous phase;
   adjusting the one or more process parameters to manipulate the amount of organic material entrained in the aqueous phase of the solvent extraction unit; and
   using the Shear Stress in Fluids equation to estimate the interfacial shear stress,
   wherein the step of using the computational model comprises using Navier-Stokes equations to estimate a velocity profile of the aqueous phase and to estimate a velocity profile of the organic phase.

2. The method for manipulating an amount of organic material entrained in an aqueous phase of a solvent extraction unit of claim 1, further comprising the step of inputting conditions for one or more solvent extraction parameters selected from the list of: process temperature, an organic phase depth, a crud depth, an aqueous phase depth, an organic material, flow rate, an aqueous material flow rate, an aqueous material recycle flow rate, a raffinate flow rate, a stripped organic material recycle flow rate, a crud flow rate, a loaded organic flow rate, an organic-to-aqueous ratio in the solvent extraction unit, a percentage of organic material recovered, an aqueous material specific flow, an organic material specific flow, an aqueous phase retention time, an organic phase retention time, a crud retention time, a solvent extraction unit configuration, a settler dimension, a location of a flow distribution fence, a type of a flow distribution fence, a number of flow distribution fences, a time when a flow distribution fence was last cleaned, a viscosity of the organic material, a viscosity of the pregnant leach solution, a viscosity of the aqueous phase, a viscosity of the organic phase, a density of the organic phase, a density of the aqueous phase, a break time of a mixer, a type of mixer, whether pumping was employed, a speed of the mixer; amps applied to a mixer, a frequency of crud pumping, an organic reagent, an organic diluent, a ratio of organic reagent to reagent diluent, a separator configuration a separator flow rate, and whether coalescing packs are used.

3. The method for manipulating an amount of organic material entrained in an aqueous phase of a solvent extraction unit of claim 1, wherein the step of selecting one or more process parameters comprises selecting one or more of: process temperature, an organic phase depth, a crud depth, an aqueous phase depth, an organic material flow rate, an aqueous material flow rate, an aqueous material recycle flow rate, a stripped organic material recycle flow rate, a raffinate flow rate, a crud flow rate, a loaded organic flow rate, an organic-to-aqueous ratio in the solvent extraction unit, a percentage of organic material recovered, an aqueous material specific flow, an organic material specific flow, an aqueous phase retention time, an organic phase retention time, a crud retention time, a solvent extraction unit configuration, a settler dimension, a location of a flow distribution fence, a type of a flow distribution fence, a number of flow distribution fences, a time when a flow distribution fence was last cleaned, a viscosity of the organic material, a viscosity of the pregnant leach solution, a viscosity of the aqueous phase, a viscosity of the organic phase, a density of the organic phase, a density of the aqueous phase, a break time of a mixer, a type of mixer, whether pumping was employed, a speed of the mixer, amps applied to a mixer, a frequency of crud pumping, an organic reagent, an organic diluent, a ratio of organic reagent to reagent diluent, a separator configuration a separator flow rate, and whether coalescing packs are used.

4. The method for manipulating an amount of organic material entrained in an aqueous phase of a solvent extraction unit of claim 1, wherein the step of adjusting the one or more process parameters comprises manipulating one or more of: process temperature, an organic phase depth, a crud depth, an aqueous phase depth, an organic material flow rate, an aqueous material flow rate, an aqueous material recycle flow rate, a stripped organic material recycle flow rate, a raffinate flow rate, a crud flow rate, a loaded organic flow rate, an organic-to-aqueous ratio in the solvent extraction unit, a percentage of organic material recovered, an aqueous material specific flow, an organic material specific flow, an aqueous phase retention time, an organic phase retention time, a crud retention time, a solvent extraction unit configuration, a settler dimension, a location of a flow distribution fence, a type of a flow distribution fence, a number of flow distribution fences, a time when a flow distribution fence was last cleaned, a viscosity of the organic material, a viscosity of the pregnant leach solution, a viscosity of the aqueous phase, a viscosity of the organic phase, a density of the organic phase, a density of the aqueous phase, a break time of a mixer, a type of mixer, whether pumping was employed, a speed of the mixer, amps applied to a mixer, a frequency of crud pumping, an organic reagent, an organic diluent, a ratio of organic reagent to reagent diluent, a separator configuration a separator flow rate, and whether coalescing packs are used.

5. The method for manipulating an amount of organic material entrained in an aqueous phase of a solvent extraction unit of claim 1, wherein the step of using comprises obtaining a correlation between a plurality of estimated interfacial shear stress values and a plurality of measured values of organic material entrained in the aqueous phase.

6. The method for manipulating an amount of organic material entrained in an aqueous phase of a solvent extraction unit of claim 1, further comprising the step of using the computational model to estimate an adjustment for the one or more process conditions to obtain a desired estimated value for organic material entrained in the aqueous phase.

7. The method for manipulating an amount of organic material entrained in an aqueous phase of a solvent extraction unit of claim 1, wherein the step of adjusting the one or more process parameters comprises adjusting the one or more parameters to obtain a minimum estimated amount of organic material entrained in the aqueous phase.

8. The method for manipulating an amount of organic material entrained in an aqueous phase of a solvent extraction unit of claim 1, wherein at least a portion of the method is performed using a computer readable medium.

9. A method to alter an amount of organic material loss in a solvent extraction unit, the method comprising the steps of:
   calculating a velocity profile of an aqueous phase;
   calculating a velocity profile of an organic phase;
   calculating an interfacial shear stress using the velocity profile of the aqueous phase and the velocity profile of the organic phase;
   estimating an amount of organic material entrained in the aqueous phase based on a calculated interfacial shear stress;

determining a target amount of organic material entrained in the aqueous phase; and manipulating at least one process condition of the solvent extraction unit to obtain the target amount of organic material entrained in the aqueous phase.

10. The method to alter an amount of organic material loss in a solvent extraction unit of claim 9, wherein the step of estimating an amount of organic material entrained in the aqueous phase comprises using a correlation between a plurality of estimated values for interfacial shear stress and a plurality of measured values of organic material entrained in the aqueous phase.

11. The method to alter an amount of organic material loss in a solvent extraction unit of claim 9, further comprising the step of inputting conditions for one or more solvent extraction unit process parameters.

12. The method to alter an amount of organic material loss in a solvent extraction unit of claim 9, wherein the step of determining a target an amount of organic material entrained in the aqueous phase comprises determining an estimated minimum amount of organic material entrained in the aqueous phase.

13. The method to alter an amount of organic material loss in a solvent extraction unit of claim 9, wherein the step of estimating an amount of organic material entrained in the aqueous phase based on a calculated interfacial shear stress comprises using a regression of estimated interfacial shear stress values and values for organic material entrained in the aqueous phase.

14. The method to alter an amount of organic material loss in a solvent extraction unit of claim 9, wherein at least a portion of the method is performed using a computer readable medium.

15. A method for manipulating an amount of organic material entrained in an aqueous phase of a solvent extraction unit, the method comprising the steps of:

providing a computational model for estimating an amount of organic material entrained in an aqueous phase of a solvent extraction unit as a function of an interfacial shear stress between an organic phase and the aqueous phase;

using the computational model to estimate a target amount of organic material entrained in the aqueous phase;

selecting one or more process parameters to manipulate the amount of organic material entrained in the aqueous phase; and adjusting the one or more process parameters to manipulate the amount of organic material entrained in the aqueous phase of the solvent extraction unit, wherein the step of using comprises obtaining a correlation between a plurality of estimated interfacial shear stress values and a plurality of measured values of organic material entrained in the aqueous phase.

\* \* \* \* \*